Aug. 3, 1926.
J. T. PEARSON ET AL
1,594,751
COVER FOR ELECTRIC CONDUIT OUTLET BOXES
Filed May 16, 1922
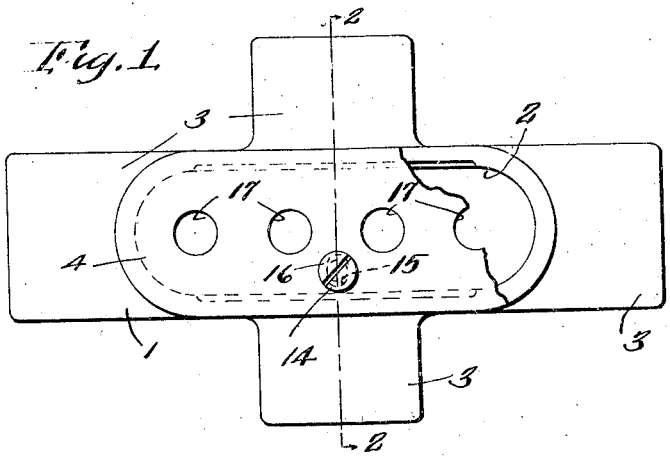
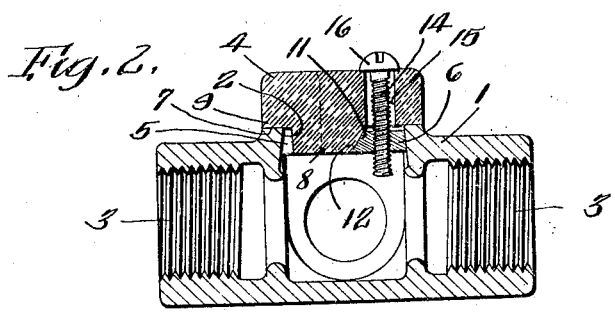
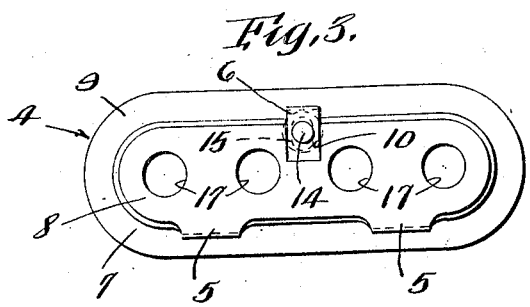
John T. Pearson and Raymond H. Alley, INVENTORS
BY
Parsons & Bodell, ATTORNEYS.

Patented Aug. 3, 1926.

1,594,751

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

COVER FOR ELECTRIC-CONDUIT OUTLET BOXES.

Application filed May 16, 1922. Serial No. 561,520.

This invention relates to covers for electric conduit outlet boxes, and has for its object a particularly simple, efficient and compact means for attaching the covers to such boxes. The invention consists in the novel features and in the combinations and constructions hereinafter set forth and claimed.

In describing this invention, reference is had to the accompanying drawings in which like characters designate corresponding parts in all the views.

Figure 1 is a plan view, partly broken away of this cover for conduit outlet boxes, it being shown as mounted on a conduit outlet box.

Figure 2 is a sectional view on line 2—2, Fig. 1.

Figure 3 is an inverted plan view of the cover.

1 designates the conduit outlet box which may be of any suitable form, size and construction, it being here shown as elongated in general form and as having an elongated opening 2 in one side, and means as one or more nipples 3 for connection in an electric conduit. The opening 2 is preferably coextensive with one side of the box.

4 designates the cover for the box, it being elongated to conform to the opening 2.

The cover 4 is formed with spaced apart shoulders 5 on its inner side presented toward and set in from the edge of one side of the cover in position to engage the inner face of the margin of one of the sides of the box around the opening 2, and with a laterally shiftable clamping member 6 presented toward and inset from the opposite side edge of the cover in position to engage when thrust laterally the inner face of the wall of the box opposite the wall engaged by the shoulder 5. The clamping member 6 is preferably located midway between said shoulders 5 and said shoulders 5 and member 6 are arranged to engage the opposite long walls around the opening 2.

As here illustrated, the cover is formed with a marginal rabbet 7 around the margin in its inner face which provides a central reduced portion 8 extending into the opening 2 and a flange 9 lapping the edge of the walls around the opening 2; the shoulders 5 and clamping member 6 project from the reduced portion partly into the rabbet beneath the flange 9.

The reduced portion is also formed with a recess 10 in its inner face opening toward the edge of the cover, and the clamping member extends into the recess. The end wall of the recess and the contiguous end of the clamping member are formed with coacting faces which act to thrust the clamping member outwardly, when the operating means for said member is actuated.

As illustrated, the end wall of the recess and the end of the clamping member are formed with inclined faces 11, 12 formed toward the cover by the operating means.

The cover may be sometimes formed of porcelain or other insulating compound, or it may be formed of metal.

The operating means comprises a screw 14 extending through the cover from the upper side thereof and threading in the clamping member which is practically a nut held from turning movement. The hole 15 in the cover through which the screw extends is large enough to permit lateral movement of the screw without tilting of the clamping member, when the clamping member shifts laterally during tightening of the screw, by reason of the action of the inclined faces 11, 12. The head 16 of the screw is large enough to cover the hole in all positions of the screw.

Preferably, the engaging faces of the shoulders 5 and member 6 are beveled and the margins of the walls of the box around the opening 2 are correspondingly underbevelled so that when the screw 14 is tightened the shoulders and clamping member practically interlock with the walls of the box.

The cover may be provided with one or more wire openings 17. Owing to the relative arrangement of the shoulders 5 and single clamping member 6, the cover is firmly and quickly attached by a single screw.

What we claim is:

The combination of a shallow conduit outlet box, having an opening in one side with opposing substantially parallel walls, and means for connection to a conduit system for the inlet and outlet of the wires, a cover having a marginal rabbet in its inner side for receiving the edge of the box around the opening, the rabbet forming a reduced portion which extends into the box and being provided with substantially parallel sides opposing said walls, one side of the reduced portion being formed with shoulders spaced apart for engaging the inner face of the opposing wall of the box, and the opposite side of such reduced portion having a recess therein located between parallel planes extending crosswise of the cover through the spaced apart shoulders and a laterally movable clamping member located in the recess and projecting out of the same into engagement with said wall of the box opposite to that engaged by said shoulders, the clamping member being arranged out of line with said conduit connecting means of the box, and the reduced portion forming a housing for the clamping member and means for operating the clamping member from the outside of the box.

In testimony whereof, we have hereunto signed our names, at Syracuse, in the county of Onondaga, and State of New York, this 12th day of May, 1922.

JOHN T. PEARSON.
RAYMOND H. OLLEY